United States Patent
Ferdous et al.

(10) Patent No.: US 12,542,187 B2
(45) Date of Patent: Feb. 3, 2026

(54) APPARATUS AND METHOD TO IMPROVE READ WINDOW BUDGET IN A THREE DIMENSIONAL NAND MEMORY

(71) Applicant: Intel NDTM US LLC, Santa Clara, CA (US)

(72) Inventors: Rifat Ferdous, Santa Clara, CA (US); Sung-Taeg Kang, Palo Alto, CA (US); Golnaz Karbasian, San Jose, CA (US); Ali Khakifirooz, Brookline, MA (US); Rohit S. Shenoy, Fremont, CA (US)

(73) Assignee: Intel NDTM US LLC, Santa Clara, CA (US)

( * ) Notice: Subject to any disclaimer, the term of this patent is extended or adjusted under 35 U.S.C. 154(b) by 37 days.

(21) Appl. No.: 18/206,864

(22) Filed: Jun. 7, 2023

(65) Prior Publication Data
US 2023/0317180 A1 Oct. 5, 2023

(51) Int. Cl.
*G11C 16/34* (2006.01)
*G11C 16/32* (2006.01)

(52) U.S. Cl.
CPC ......... *G11C 16/3427* (2013.01); *G11C 16/32* (2013.01); *G11C 16/3459* (2013.01)

(58) Field of Classification Search
CPC ............................. G11C 16/3427; G11C 16/34
USPC ...................................... 365/185.22
See application file for complete search history.

(56) References Cited

U.S. PATENT DOCUMENTS

| | | | |
|---|---|---|---|
| 7,577,034 B2 * | 8/2009 | Lee | G11C 11/5628 365/185.18 |
| 9,330,784 B2 | 5/2016 | Pangal et al. | |
| 2008/0285368 A1 | 11/2008 | Hung et al. | |
| 2009/0175087 A1 * | 7/2009 | Park | G11C 16/3454 365/185.25 |
| 2011/0080789 A1 | 4/2011 | Kalavade et al. | |
| 2011/0292724 A1 | 12/2011 | Kim | |
| 2012/0008405 A1 * | 1/2012 | Shah | G11C 29/702 365/185.22 |
| 2015/0052387 A1 | 2/2015 | Kern et al. | |
| 2018/0158529 A1 | 6/2018 | Goda et al. | |
| 2019/0006016 A1 * | 1/2019 | Khakifirooz | G11C 8/10 |
| 2020/0185046 A1 * | 6/2020 | Li | G11C 16/10 |
| 2023/0134281 A1 * | 5/2023 | Raimondo | G11C 16/10 365/185.22 |
| 2023/0317180 A1 | 10/2023 | Ferdous et al. | |

OTHER PUBLICATIONS

International Search Report and Written Opinion for PCT Patent Application No. PCT/US23/36383, Mailed Feb. 28, 2024, 12 pages.

* cited by examiner

*Primary Examiner* — Muna A Techane
(74) *Attorney, Agent, or Firm* — Morgan, Lewis & Bockius LLP

(57) ABSTRACT

The gap width in a threshold voltage (Vt) distribution for a 3D NAND Flash cell is improved by performing touchup program on a selected portion of the word lines in a block after all of the word lines in the block have been programmed.

20 Claims, 12 Drawing Sheets

APPARATUS AND METHOD TO IMPROVE READ WINDOW BUDGET IN A THREE DIMENSIONAL NAND MEMORY

FIELD

This disclosure relates to non-volatile memory devices and in particular to NAND Flash memory devices.

BACKGROUND

Non-volatile memory refers to memory whose state is determinate even if power is interrupted to the device. Storage devices that include non-volatile memory include a secure digital card, a multimedia card, a flash drive (for example, a Universal Serial Bus (USB) flash drive also known as a "USB thumb drive" or "USB memory stick" that includes non-volatile memory with an integrated USB interface), and a solid-state drive.

The non-volatile memory can comprise a block addressable memory device, such as NAND, or more specifically, multi-threshold level NAND Flash memory (for example, Single-Level Cell ("SLC"), Multi-Level Cell ("MLC"), Tri-Level Cell ("TLC"), Quad-Level Cell ("QLC"), Penta-Level Cell ("PLC") or some other NAND). Three Dimensional (3D) NAND is a type of non-volatile flash memory in which memory cells are stacked vertically in multiple layers. For example, 32, 48, 64 or more cell layers can be stacked vertically.

NAND Flash memory devices typically use a one-transistor memory cell that allows for high memory densities, high reliability, and low power consumption. Memory cells are typically arranged in a memory array and are addressable with a row/column format.

The NAND Flash cell uses the threshold voltage of a floating-gate transistor to represent the data stored in the cell. In a SLC NAND flash memory, each memory cell has two voltage levels corresponding to two states (0, 1) to represent one bit. In a MLC, TLC, QLC and PLC NAND flash memory, each memory cell stores more than one bit. Each cell in a MLC NAND Flash memory uses four voltage levels corresponding to four states (00, 01, 10, 11) to represent 2 bits of binary data. Each cell in a TLC NAND Flash memory uses eight voltage levels corresponding to eight states (000 to 111) to represent 3 bits of binary data. Each cell in a QLC NAND Flash memory uses sixteen voltage levels corresponding to sixteen states (0000 to 1111) to represent 4 bits of binary data. Each cell in a PLC NAND Flash memory uses thirty two voltage levels corresponding to thirty two states (00000 to 11111) to represent 5 bits of binary data.

For example, a Multi-Level Cell ("MLC"), has four threshold voltages for four levels (states) to store two bits of data. A first threshold voltage for Level 0 (L0) corresponds to an erase state of 11, a second threshold voltage for level 1 (L1) corresponds to a first program level of 10, a third threshold voltage for Level 2 (L2) corresponds to a second program level of 00, and a fourth threshold voltage for Level 3 (L3) correspond to a program level of 01.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

Figure 1A:
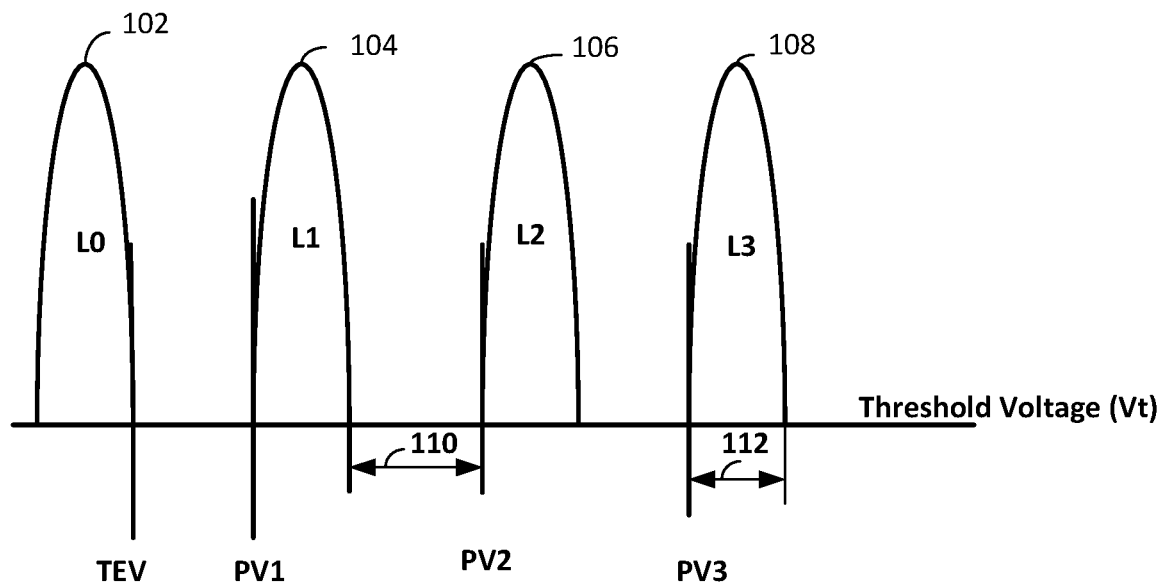
FIG. 1A is a graph that illustrates an example of threshold voltage distributions for a multi-level cell (MLC) with four levels or states.

FIG. 1A is a graph that illustrates an example of threshold voltage distributions for a multi-level cell (MLC) with four levels or states. Level 0 (L0) corresponds to a threshold voltage distribution for an erase state of '11', level 1 (L1) corresponds to a threshold voltage distribution for a first program state of '10', Level 2 (L2) corresponds to a threshold voltage distribution for second program state of '00', and Level 3 (L3) corresponds to a threshold voltage distribution for a program state of '01'.

Program states '10', '00' and '01' correspond to threshold voltage distributions 104, 106 and 108. Erase state '11' corresponds to threshold voltage distribution 102. The threshold voltage distributions 102, 104, 106 and 108 represent statistical distributions of measured threshold voltages for a large number of memory cells. Each threshold voltage distribution 102, 104, 106 and 108 has a threshold voltage distribution width 112.

Upon erase, the MLC is erased to a threshold voltage (Vt) below an Erase Verify (TEV) voltage that corresponds to Level 0 (L0). The MLC is programmed to Level 1 (L1), Level 2 (L2) or Level 3 (L3), based on the threshold voltage above the respective program verify voltages (PV1, PV2, PV3) that is applied to the MLC during program of the MLC.

As the number of voltage levels (states) in a memory cell are increased, the gap 110 between threshold voltage distributions 102, 104, 106 and 108 can decrease due to limitations in applying higher voltages. As a result, the memory cell may be susceptible to thermal noise, random telegraph signaling (also known as burst noise), cycle fatigue resulting from repeated program/erase cycles, and disturbances due to read and write operations in adjacent cells. For example, a decrease in the width of the gap 110 can be due to a loss of charge in the 3D NAND flash cell after verification has passed for a voltage level (state) (for example L1, L2, L3 in a MLC) or when there is an incorrect verification of the memory cell due to noise.

Figure 1B:
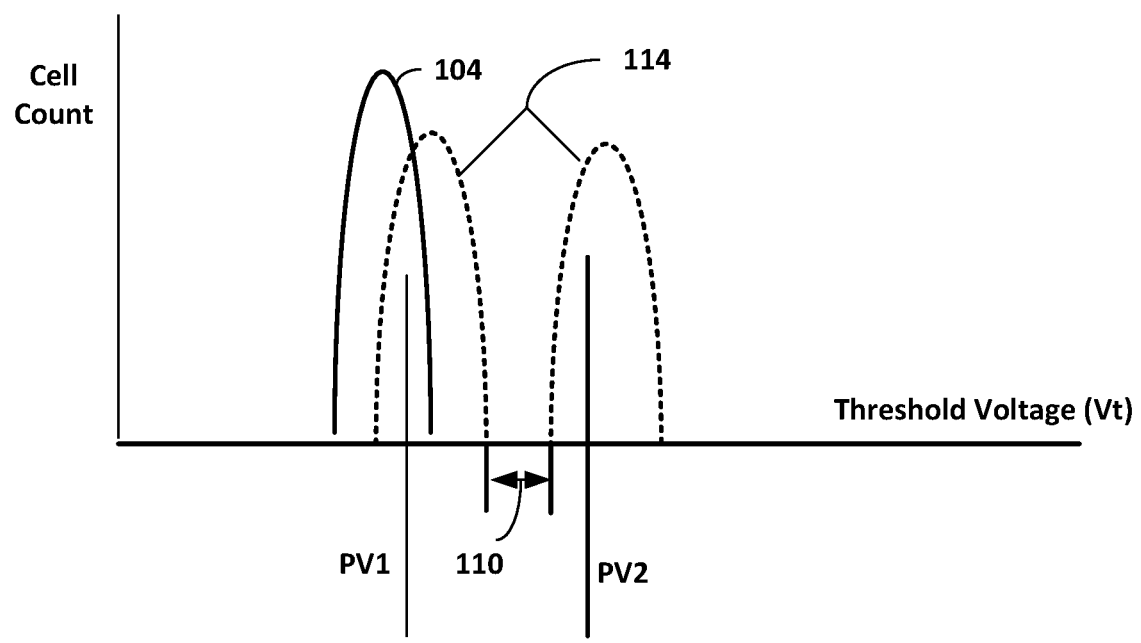
FIG. 1B is a graph that illustrates an example of threshold voltage distributions for a 3D NAND flash cell before and after programming.

FIG. 1B is a graph that illustrates an example of threshold voltage distributions for a 3D NAND flash cell before and after programming.

During programming, the threshold voltage (Vt) for a 3D NAND flash cell can be impacted by write operations in adjacent 3D NAND flash cells. The impact can be reduced by programming 3D NAND flash cells in multiple programming steps to minimize the change in threshold voltage in a single programming step.

For example, in MLC, in step 1, cells that belong to L2 and L3 are programmed to a threshold voltage that is slightly lower than L2 voltage level that can be referred to as a L2-L3 parent voltage level. In step 2, the L2 voltage level and L3 voltage level are programmed from the L2-L3 parent voltage level.

In this case all the cells undergo programming with an increase in threshold voltage. However, a portion of the threshold voltage distributions for the cells are below the program verify voltage (PV) due to charge loss post programming and false verify due to Random Telegraph Signal (RTS) noise.

Referring to FIG. 1B, a portion of the threshold voltage distributions 104 of the cells prior to programming is below program verify voltage 1 (PV1). A portion of the threshold voltage distribution of the cells after programming 114 is below program verify voltage 1 (PV2) and program verify voltage 2 (PV2). The width of the gap 110 between threshold voltage distributions in the programmed cell is reduced.

The threshold voltage (Vt) distribution for a 3D NAND flash cell can be less than the assigned program verify (PV) voltage after the completion of programming due to noise. A verified cell threshold voltage distribution can also drop below the program verify voltage due to loss of charge or de-trapping. The gap width can be improved by reducing the programming gate step (difference in program voltage between successive pulses). While the gate step is large, the gap width improves with gate step reduction. However, improvement in the gap width is minimal with additional reduction of the programming gate step.

The gap width is improved by performing an additional program step (also referred to as touch program) to a selected portion of the word lines in a block after all of the word lines in the block have been programmed.

The sum of the gap widths between the threshold voltage distributions of all levels is called the read window budget. Higher read window budget is desirable to improve reliability margins.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 2:
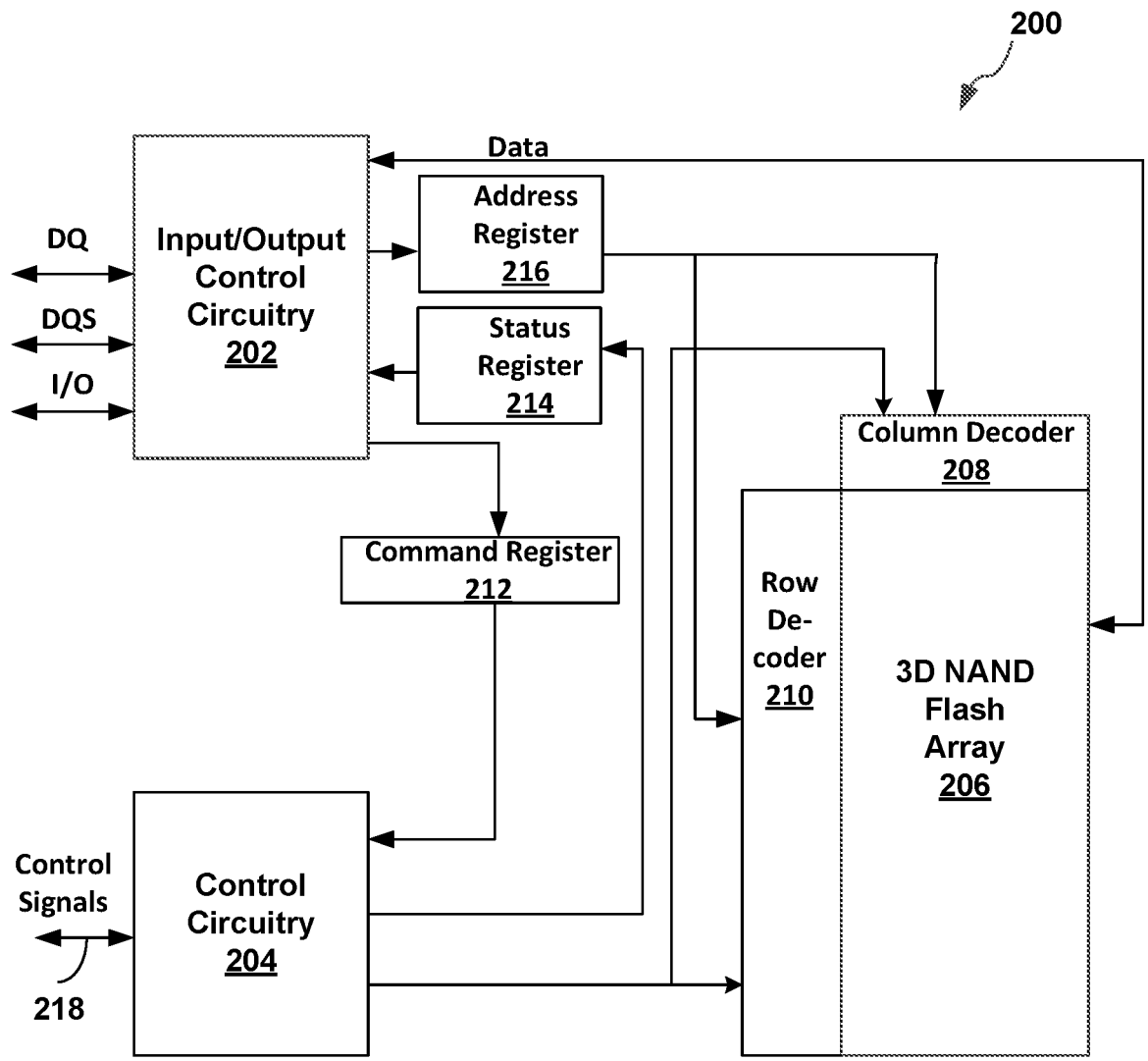
FIG. 2 is a block diagram of a Three-Dimensional (3D) NAND Flash device.

FIG. 2 is a block diagram of a Three-Dimensional (3D) NAND device 200. The 3D NAND device 200 includes Input/Output Control circuitry 202 and control circuitry 204 that are coupled to a host memory controller (not shown) via a plurality of control and data signals. The 3D NAND device 200 also includes a 3D NAND Flash array 206 that includes a plurality of NAND cells organized in rows and columns.

A row decoder 210 and a column decoder 208 are provided to decode address signals to access the 3D NAND Flash array 206. The 3D NAND device 200 further includes input/output control circuitry 202 to manage input of commands, addresses, and data to the 3D NAND device 200 and the output of data and status information from the 3D NAND device 200. An address register 216 is in communication with input/output control circuitry 202, and row decoder 210 and column decoder 208, to latch the address signals prior to decoding. A command register 212 is in communication with input/output control circuitry 202 and control circuitry 204 to latch incoming commands.

Control circuitry 204 controls access to the 3D NAND Flash array 206 in response to the commands and generates status information that is stored in status register 214. Control circuitry 204 is in communication with row decoder 210 and column decoder 208 to control the row decoder 210 and column decoder 208 in response to the addresses.

The Open NAND Flash Interface (ONFI) is a standard that defines the operation of the data bus and the control signals. The ONFI standard supports an 8-bit or 16-bit data bus (two independent 8-bit data buses) and up to four NAND die in a package.

The Input/Output Control circuitry 202 in the 3D NAND device 200 communicates with the host memory controller via a bidirectional data bus (DQ) and a bidirectional data strobe (DQS) signal. The DQS signal is used to indicate a data valid window. The control circuitry 204 in the 3D NAND device 200 receives control signals 218 from the host memory controller. The control signals 218 that are received include chip enable (CE #) to select the 3D NAND device 200 for data transfer with the host memory controller, Address Latch Enable (ALE) to indicate the type of bus cycle (command, address or data), Command Latch Enable (CLE) to indicate the type of bus cycle (command, address or data), Read Enable (RE #), Write Enable (WE #), and Write Protect (WP #) to disable program and erase operations. The 3D NAND device 200 also includes control signals 218 output by control circuitry 204 that include a Ready/Busy (R/B #) signal to indicate whether the 3D NAND device 200 is executing an operation ("busy") or is ready for a next operation.

It will be appreciated that the memory device of FIG. 2 may include additional circuitry and signals, and that the functional blocks of the memory device may not necessarily be segregated as shown in this example case. For example, a single component or component portion of an integrated circuit device could be adapted to perform the functionality of more than one block component of FIG. 2. Alternatively, or in addition, functionality of a single block component of FIG. 2 may be distributed into multiple blocks. Additionally, while specific I/O pins are described in accordance with popular conventions for receipt and output of the various signals, it is noted that other combinations or numbers of I/O pins may be used in the various embodiments. Many variations will be appreciated.

Figure 3:
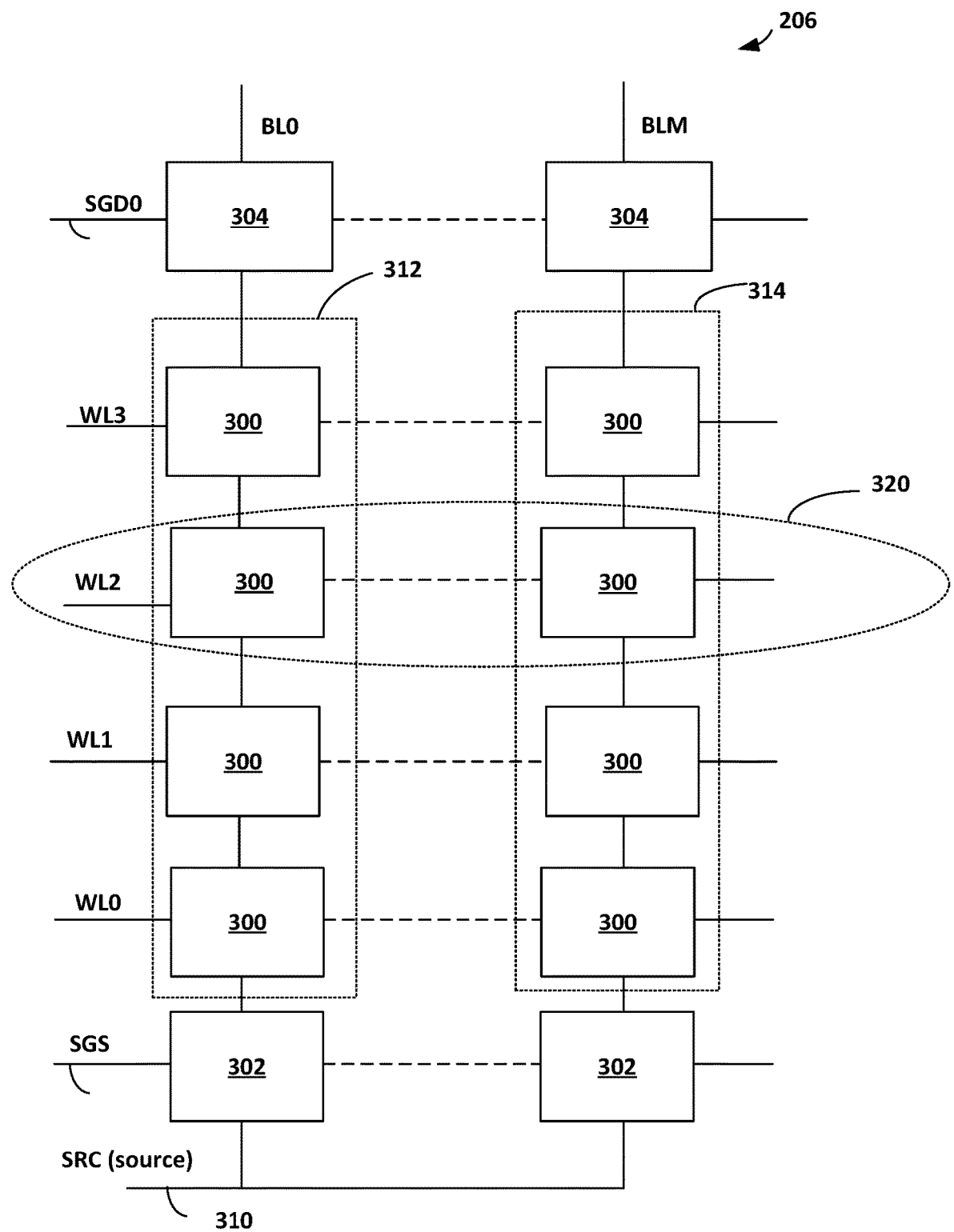
FIG. 3 is a block diagram illustrating a plurality of NAND cells in the 3D NAND Flash array shown in FIG. 2.

FIG. 3 is a block diagram illustrating a plurality of NAND cells in the 3D NAND Flash array 206 shown in FIG. 2. Each of the plurality of NAND cells 300 in the 3D NAND Flash array 206 is connected to a word line (WL) and a bit line (BL). A NAND cell 300 can be selected via the BL and the WL. Four word lines labeled W0-W3 and two bit lines labeled BL0, BLM are shown in FIG. 3. A pillar is a bit line or string that connects the word lines.

In a 3D NAND Flash array 206 that includes QLC NAND cells, each NAND cell 300 can store four bits, one bit per page (upper, lower, extra, top). In a 3D NAND Flash array 206 that includes TLC NAND cells, each NAND cell 300 can store three bits, one bit per page (upper, lower, top). In a 3D NAND Flash array 206 that includes Penta-Level Cells (PLC) NAND cells, each NAND cell 300 can store five bits. The plurality of NAND cells 300 are arranged in a two-dimensional (2D) array of strings and tiers. Two 2D array of a string of NAND cells 312, 314 and four tiers WL0-WL3 are shown in FIG. 3.

Each string of NAND cells 312, 314 is coupled to a source line (SRC) 310 using a respective source-side select gate (SGS) 302 and to a respective bit line BL0, BLM using a respective drain-side select gate (SGD) 304. In the example shown there are 4 tiers, other examples can include strings of NAND cells having more or fewer tiers or bit lines.

The 3D NAND Flash array 206 is divided into blocks with each block divided into pages. Each page comprises a plurality of NAND cells 300 that share a word line. As shown in FIG. 3, all of the NAND cells 300 in page 320 are coupled to WL2. A block includes the NAND strings that share the same group of word lines. The block is the smallest erasable unit of NAND cells in the 3D NAND device. In a block erase operation, a group of consecutive pages is erased in a particular operation. Erase operates on an entire block of NAND cells 300 and sets all the NAND cells in the block to a logical "1".

To program (write) data to a page 320, a program voltage (Vpgm) is applied to the selected word line (WL2) and thus, to a control gate of each NAND cell 300 coupled to the selected word line. While the program voltage (Vpgm) is applied to the selected word line, a potential, such as a ground potential, can be applied to the bit lines of the NAND cells 300 in the page 320, resulting in a charge transfer to a floating gate of each NAND cell 300 in the page 320. A pass voltage (Vpass) can be applied to one or more word lines (for example, WL3, WL1, WL0) in the block having NAND cells 300 that are not being programmed and a 2 Volts to about 3 Volts inhibit voltage can be applied to bit lines having NAND cells 300 that are not being programed to inhibit charge from being transferred to the floating gates of the NAND cells 300 that are not selected for programming.

To erase a block of NAND cells 300, a 18 Volts to about 20 Volts erasure voltage is applied between the sources and drains of the NAND cells 300 in the block using one or more bit lines and select gates while the word lines of the targeted NAND cells 300 are kept at a ground potential resulting in a charge transfer from the floating gates of the NAND cells in the block. An erase operation is the process of removing electrons from the floating gates to change the state of cell to logical "1". A large erasure voltage, for example, 20 Volts is required to repel the electrons from the floating gate.

Figure 4:
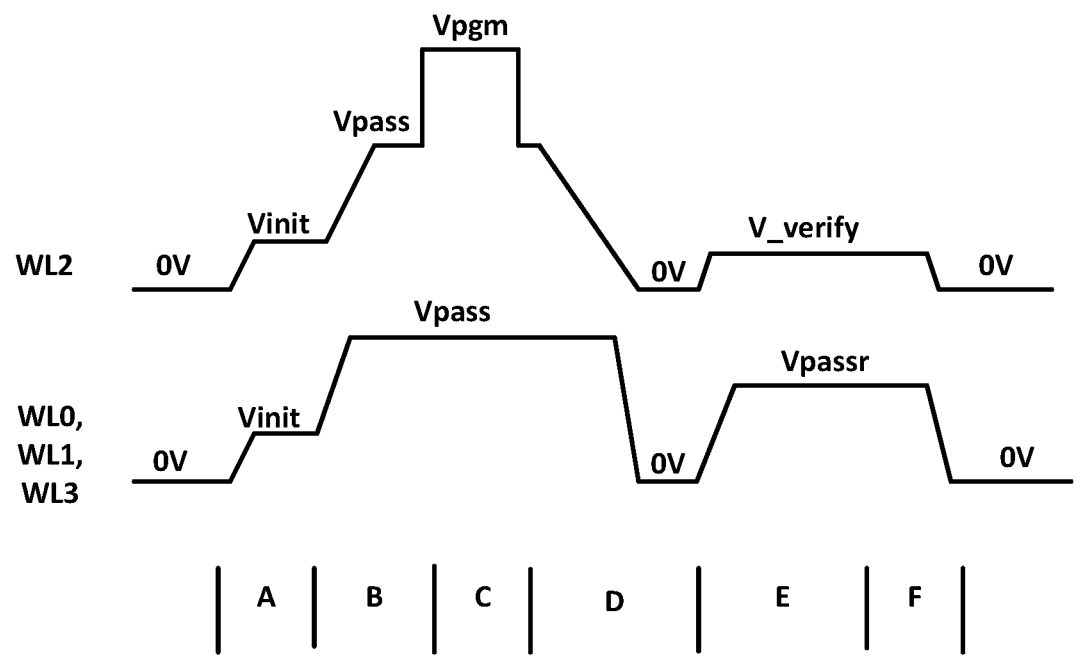
FIG. 4 is a timing diagram illustrating voltages applied to selected word line WL2 and non-selected word lines WL0, WL1, WL3 to program the selected word line WL2.

FIG. 4 is a timing diagram illustrating voltages applied to selected word line WL2 and non-selected word lines WL0, WL1, WL3 to program the selected word line WL2.

Referring to FIG. 4, during time period A, an initialization voltage Vinit is applied to selected word line WL2 and unselected word lines WL0, WL1, WL3 to discharge remaining charge in the NAND cell channel.

During time period B, the voltage is slowly increased to a pass gate voltage Vpass on the selected word line WL2 and non-selected word lines WL0, WL1, WL3.

During time period C, the voltage applied to the selected word line WL2 is a program voltage Vpgm to program the NAND cells 300 in the selected word line WL2 while the pass gate voltage Vpass continues to be applied to the non-selected word lines WL0, WL1, WL3.

During time period D, the program voltage Vpgm applied to selected word line WL2 and the pass gate voltage Vpass applied to the non-selected word lines WL0, WL1, WL3 is discharged.

During time period E, the programmed NAND cells in selected word line WL2 are verified by applying a verify read voltage V_Verify_Read to the selected word line WL2 while a pass gate read voltage Vpassr is applied to the non-selected word lines WL0, WL1, WL3.

During time period F, the verify read voltage V_Verify_Read applied to selected word line WL2 and the pass gate read voltage Vpassr applied to the non-selected word lines WL0, WL1, WL3 are discharged.

Figure 5:
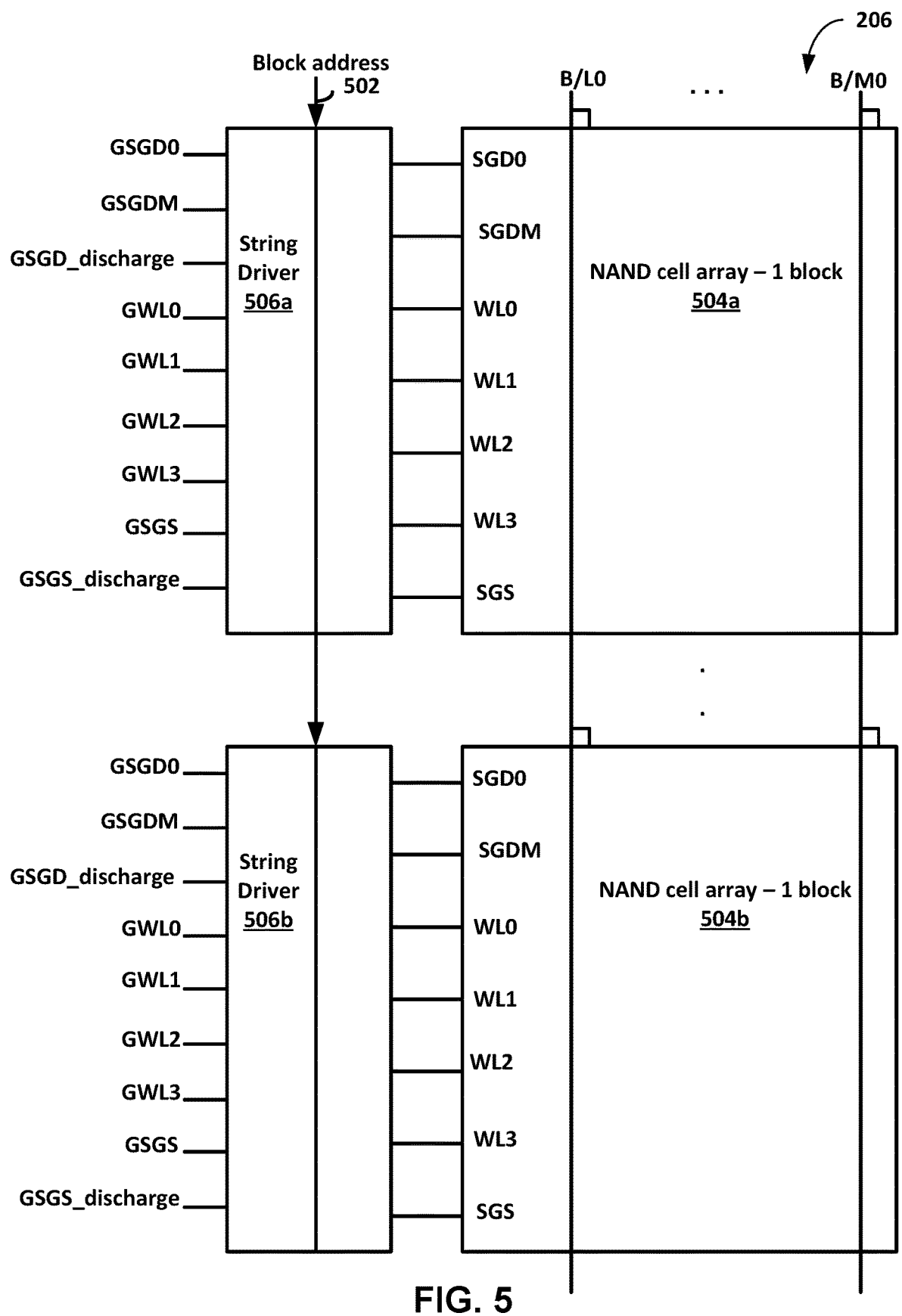
FIG. 5 is a block diagram illustrating blocks of NAND cells in the 3D NAND Flash array shown in FIG. 2.

FIG. 5 is a block diagram illustrating blocks of NAND cells in the 3D NAND Flash array 206 shown in FIG. 2. Each block of NAND cells 504a, 504b has a respective string driver 506a, 506b that includes switches that when enabled by the block address 502 allow the voltage applied to the global word lines to be applied to the respective word lines.

Figure 6:
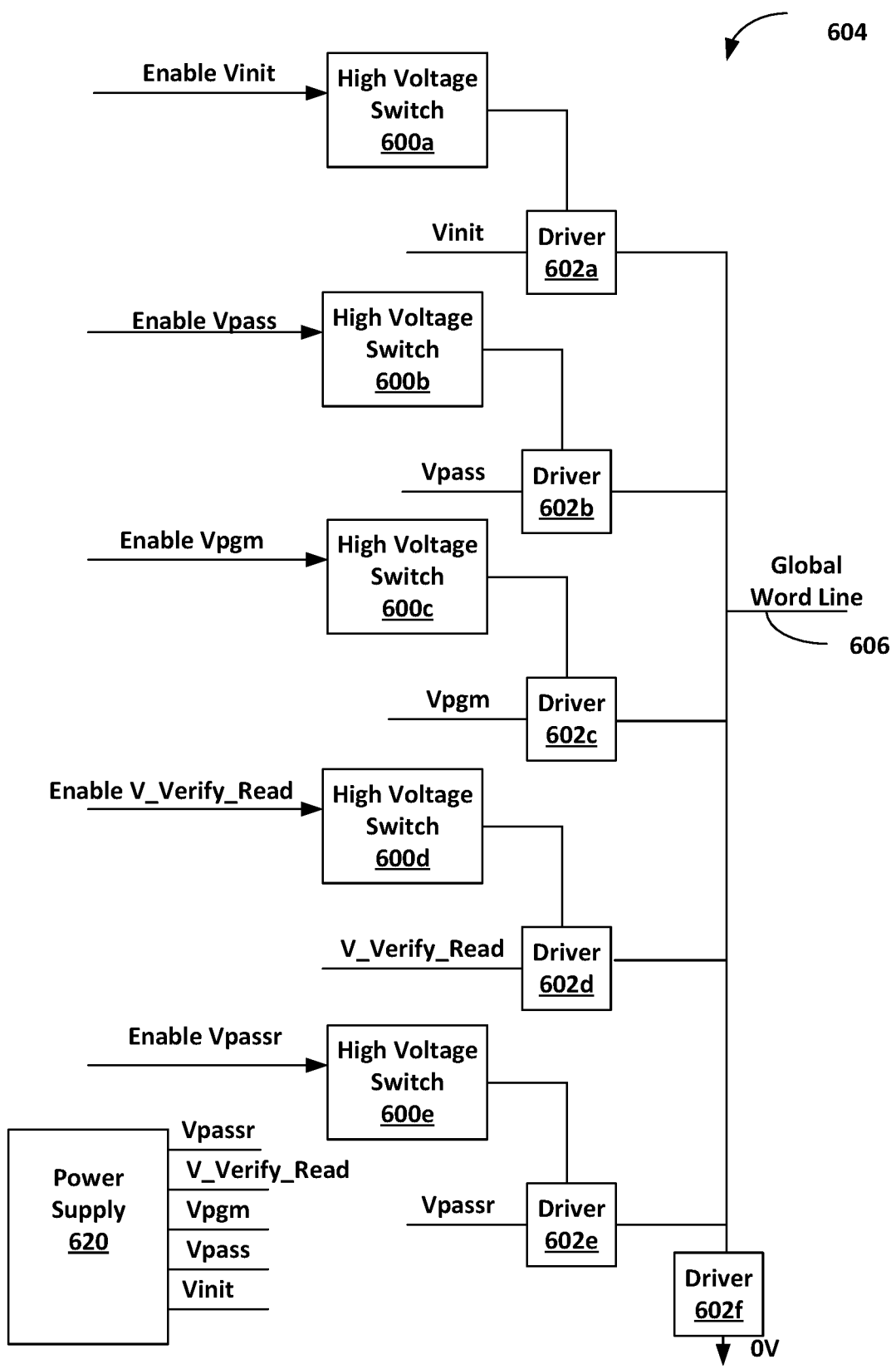
FIG. 6 is a block diagram of control circuitry to select one of a plurality of voltages from a power supply for a global word line.

FIG. 6 is a block diagram of control circuitry 604 to select one of a plurality of voltages from a power supply 620 for a global word line 606. The control circuitry includes a plurality of high voltage switches 600a-e and a plurality of global word line drivers 602a-e to enable one of the plurality of global word line drivers 602a-e to drive the selected voltage onto the global word line 606.

The selected voltage can be one of Vinit (an initialization voltage, for example, 2 Volts), Vpgm (a program voltage, for example, 20 Volts), Vpass (a pass gate voltage, for example, 7 Volts), V_Verify_Read (a verify read voltage, for example, 0-5V), or Vpassr (a pass gate read voltage, for example, 7 Volts)

The global word line 606 can be selectively coupled to multiple word lines in the 3D NAND Flash array 206.

Figure 7:
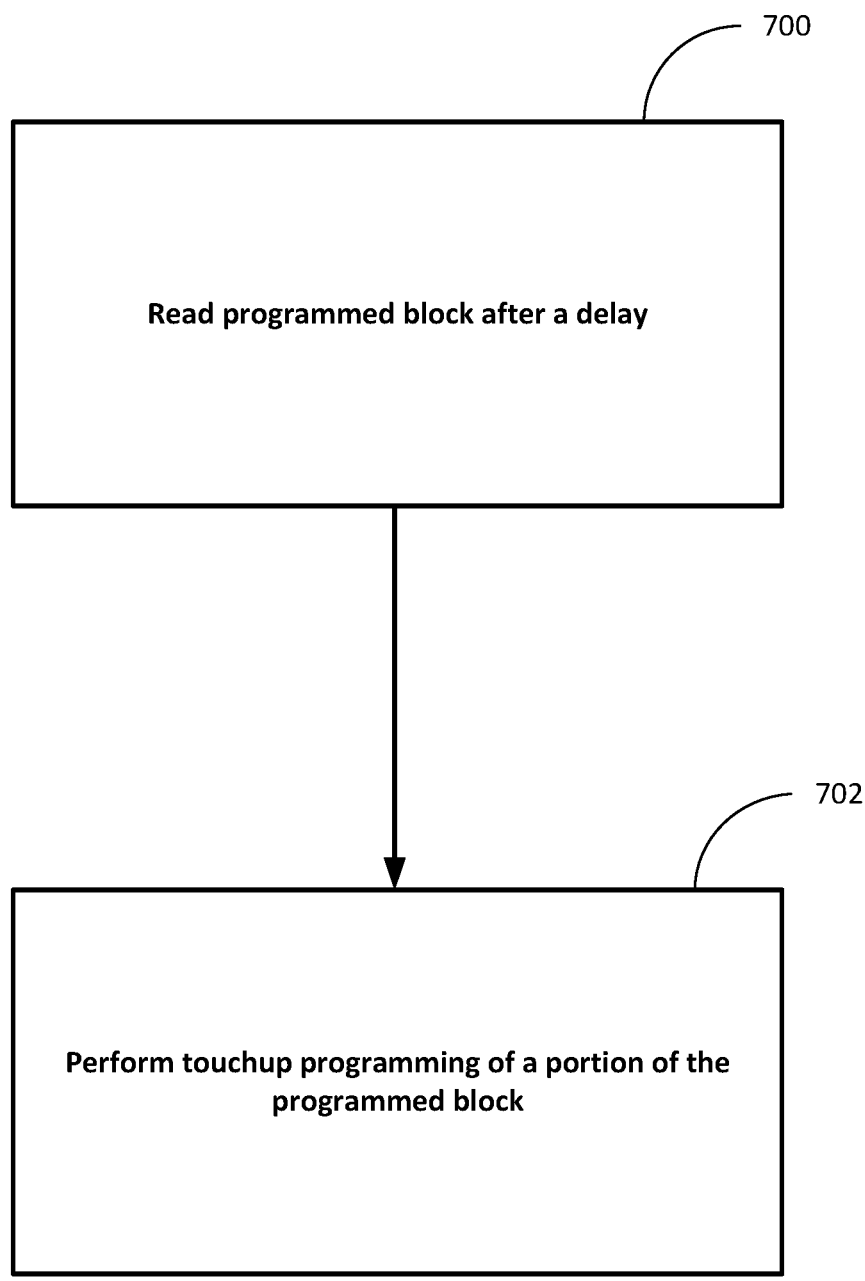
FIG. 7 is a flowgraph illustrating a method to perform a touchup program on a portion of programmed cells in a block of cells after all of the cells in the block of cells have been programmed.

FIG. 7 is a flowgraph illustrating a method to perform a touchup program on a portion of programmed cells in a block of cells after all of the cells in the block of cells have been programmed.

At block 700, after a time period (a delay time) from the time that the cells in the block of cells have been programmed, data that has been programmed in the block of cells is read from a portion of the programmed cells. The delay time is selected based on the length of time after a memory cell is programmed during which a charge loss is expected to occur after the memory cell has been programmed. For example, a charge loss can occur during a time period that is greater than 10 milliseconds after the memory cell has been programmed.

At block 702, a touch up program of a selected portion of the programmed cells (for example, a selected programmed NAND cell) in the block of cells that have been read is performed. The touch up program of a selected programmed memory cell in the block of memory cells increases the threshold voltage of the selected programmed memory cell while an inhibit voltage is applied to the bit lines of the non-selected programmed cells in the block of cells.

In an embodiment, the selected portion of the programmed memory cells in the block of cells for touchup program are in critical word lines in the block of memory cells. A critical word line is a word line that statistically has a smaller width gap 110 and thus is prone to charge loss or noise.

In an embodiment, the portion of the programmed cells in the block of cells that is selected for touchup program is based on the programmed levels of the programmed cells. For example, touchup program is performed for programmed cells that are programmed at high (or low) program levels. For example, L1-L3 are low program levels and L4-L7 are high program levels for a TLC NAND cell. L1-L7 are low program levels and L8-L15 are high program levels for a QLC NAND cell.

Noise or charge loss mechanisms and cell threshold voltage distributions can be dependent on programmed levels. As a result, touchup program can be selectively applied to one or more programmed levels, while other programmed levels do not undergo any touchup program.

Figure 8:
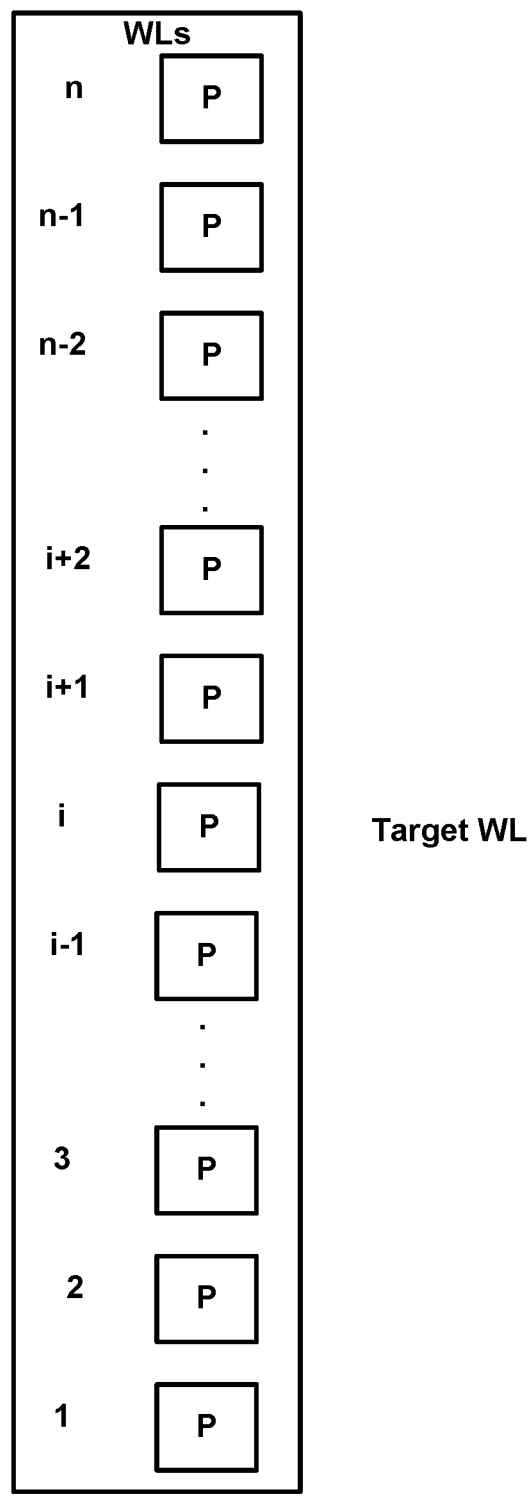
FIG. 8 is a block diagram illustrating n word lines (WLs) in the 3D NAND Flash array shown in FIG. 2.

FIG. 8 is a block diagram illustrating n word lines (WLs) in the 3D NAND Flash array 206 shown in FIG. 2. Each of the n WLs include a plurality of cells that are programmed. Boosting is enhanced by changing the inhibit scheme used to program the WLs and enhancing electron evacuation to prevent program disturb and hot carrier injection. In the example shown in FIG. 8, touchup program is to be performed on word line i. Touchup program includes a series of verify and program operations.

Figure 9:
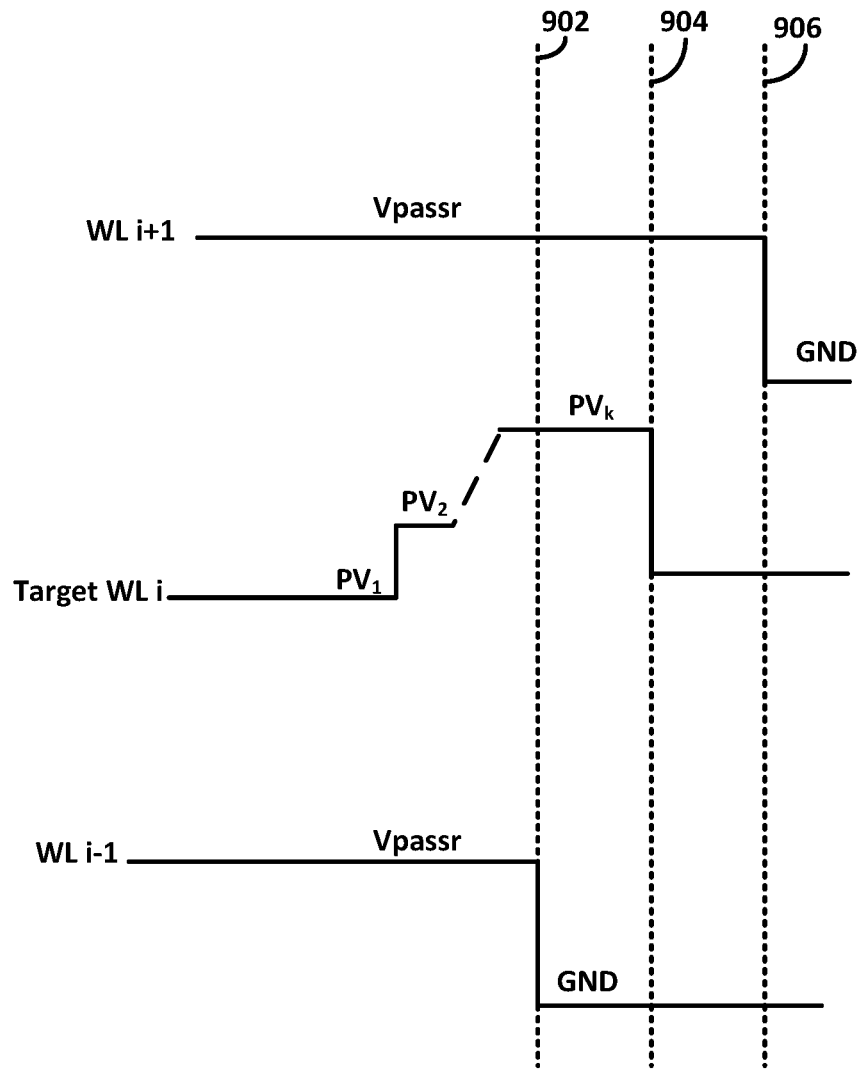
FIG. 9 is a timing diagram illustrating voltages applied to programmed word lines to perform a verify operation during a touchup program on a target word line i.

FIG. 9 is a timing diagram illustrating voltages applied to programmed word lines to perform a verify operation during touchup program on a target word line i. If the voltage applied to all of the WLs (for example, WL(i+1), WL(i) (target WL) and WL(i−1) shown in FIG. 9) is reduced to ground (GND) from Vpassr at the same time after the verify operation, the cells with the highest threshold voltage in the WL shut down first and prevent electron evacuation from the target WL (WL(i)).

During the verify operation during the touchup program on the target word line i, to improve electron removal, the voltage applied to adjacent word line i−1 and adjacent word line i+1 (WL(i−1), WL(i+1)) is reduced from Vpassr to GND sequentially in a staggered manner, as shown in FIG. 9. In another embodiment, voltages applied to a group of word lines in a range between i−p and i+q, where q is greater than or equal to 1 and p is greater than or equal to 1, is reduced from Vpassr to GND in a staggered manner. At time 902, the Vpassr voltage applied to WL(i−1) is reduced from Vpassr to GND. At time 904, the Vpassr voltage applied to WL(i) (target WL) is reduced from Vpassr to GND. At time 906, the Vpassr voltage applied to WL(i+1) is reduced from Vpassr to GND. Staggering the reduction of the voltage to GND applied to WLs near the target WL instead of reducing the voltage applied to the WLs at the same time allows for a greater number of electrons to be evacuated.

Figure 10:
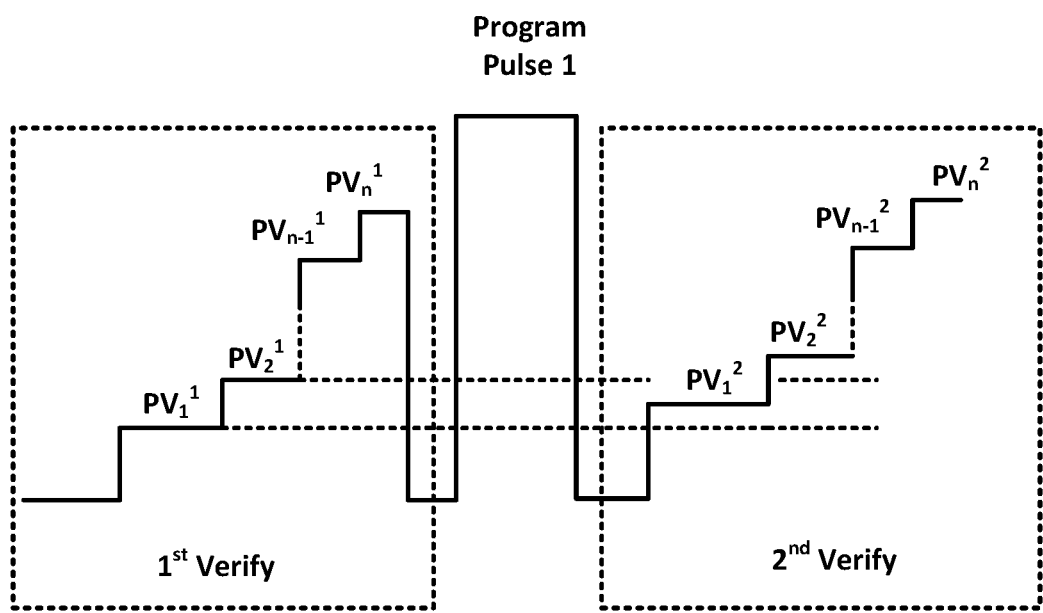
FIG. 10 is a timing diagram illustrating voltages selected by control circuitry to perform touchup program on a selected programmed word line.

FIG. 10 is a timing diagram illustrating voltages to perform a touchup program on a selected programmed word line. Touchup program includes a series of verify and program operations. Only the first two verify operations and first program operation is shown. The verify operations and program operations continue until all the cells reach a threshold voltage Vt above the targeted program verify voltages. The touchup program on the selected programmed word line can be performed as a background operation while the 3D NAND Flash array is idle. The 3D NAND Flash array is idle when there are no pending erase, write or read requests. Prior to touchup program, the width of the gap 110 between threshold voltage distributions in the programmed cell should be sufficient so that the data stored in the programmed cell can be read and can be corrected (for example, using Error Correction Code (ECC)). If the width of the gap 110 is not sufficient, the data that is read is corrupted and cannot be corrected using ECC. Touchup program increases the width of the gap 110.

A first verify step is performed on the target WL to determine the cells in the target WL with a threshold voltage (Vt) that is below the program verify voltage and are thus more susceptible to charge loss. The verify step also identifies cells in the target WL that are above the program verify voltage and these cells are inhibited and remain inhibited for all subsequent pulses. The program pulse (Vpgm voltage) is sent to all cells in the target WL. Cells in the target WL with a low voltage on the bit line are programmed. Cells in the target WL with a high bit line voltage are inhibited (not programmed).

In an embodiment, to ensure that the threshold voltage (Vt) of these cells does not decrease below the program verify voltage even after touchup program, the cells are programmed to a higher threshold voltage (Vt) compared to the threshold voltage distribution of all of the cells in a level. Cells with a threshold voltage that is less than an initial program verify voltage are programmed to a higher verify voltage. During touchup program, the cells are programmed to the higher threshold voltage (Vt) by increasing the program verify voltage after the first verify step. During the first verify, cells with a threshold voltage that is greater than the program verify voltage are inhibited. The uninhibited cells are programmed to a higher program verify voltage to selectively program cells that are prone to charge loss, to a higher threshold voltage Vt, compared to the rest of the threshold voltage distribution.

In this embodiment, during the second verify step, the touchup cells are verified against a higher program verify voltage than the program verify voltage of the first verify. This ensures that cells that are prone to charge loss have a higher threshold voltage Vt, such that after charge loss, the threshold voltage Vt is not lower than original threshold voltage. Read voltage level adjustments can be performed if needed after touchup program.

As shown in the example in FIG. 10, the program verify voltages in the first verify step are increased after a touchup program step (program pulse) as shown in the second verify step. For example, program verify voltage $PV_1^2$ (first verify step) is greater than program verify voltage $PV_1^1$ (second verify step) and $PV_2^2$ (first verify step) is greater than program verify voltage $PV_2^1$ (second verify step). The program verify voltage PV for touchup program can be either equal to or greater than the program verify voltage for program and is less than the median threshold voltage Vt of the level being programmed. FIG. 10 illustrates an example in which the program verify voltages are increased for the second verify step. The program verify voltages in the second verify step can be the same as the program verify voltages in the first verify step.

Figure 11:
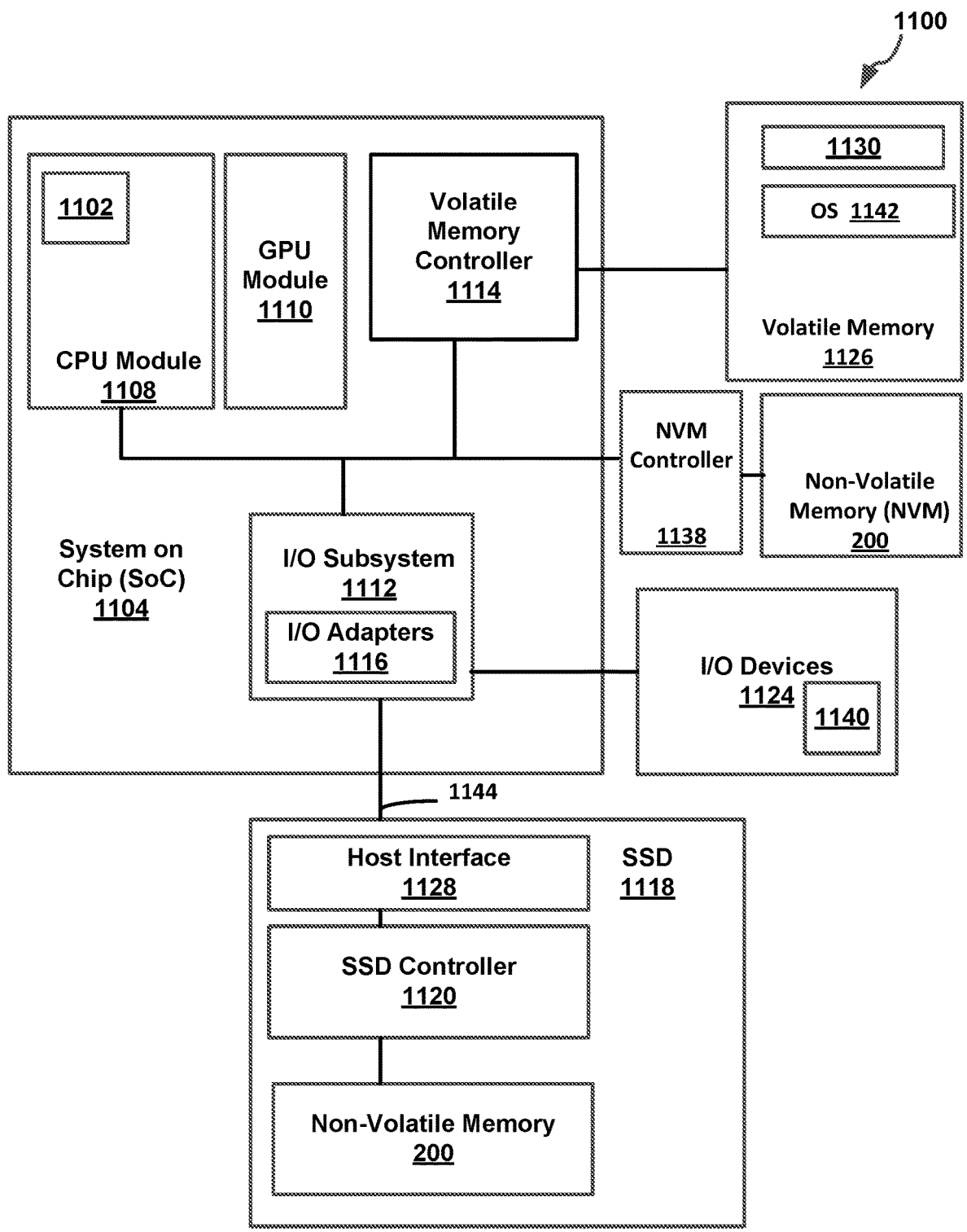
FIG. 11 is a block diagram of a computer system that includes non-volatile memory.

FIG. 11 is a block diagram of a computer system 1100 that includes 3D NAND device 200. Computer system 1100 can correspond to a computing device including, but not limited to, a server, a workstation computer, a desktop computer, a laptop computer, and/or a tablet computer.

The computer system 1100 includes a system on chip (SOC or SoC) 1104 which combines processor, graphics, memory, and Input/Output (I/O) control logic into one SoC package. The SoC 1104 includes at least one Central Processing Unit (CPU) module 1108, a volatile memory controller 1114, and a Graphics Processor Unit (GPU) 1110. In other embodiments, the volatile memory controller 1114 can be external to the SoC 1104. Although not shown, each of the processor core(s) 1102 can internally include one or more instruction/data caches, execution units, prefetch buffers, instruction queues, branch address calculation units, instruction decoders, floating point units, and retirement units. The CPU module 1108 can correspond to a single core or a multi-core general purpose processor, such as those provided by Intel® Corporation, according to one embodiment.

The Graphics Processor Unit (GPU) 1110 can include one or more GPU cores and a GPU cache which can store graphics related data for the GPU core. The GPU core can internally include one or more execution units and one or more instruction and data caches. Additionally, the Graphics Processor Unit (GPU) 1110 can contain other graphics logic units that are not shown in FIG. 11, such as one or more vertex processing units, rasterization units, media processing units, and codecs.

Within the I/O subsystem 1112, one or more I/O adapter(s) 1116 are present to translate a host communication protocol utilized within the processor core(s) 1102 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 1116 can communicate with external I/O devices 1124 which can include, for example, user interface device(s) including a display and/or a touch-screen display 1140, printer, keypad, keyboard, communication logic, wired and/or wireless, storage device(s) including hard disk drives ("HDD"), solid-state drives ("SSD") 1118, removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (Non-Volatile Memory Express) over PCIe (Peripheral Component Interconnect Express), and SATA (Serial ATA (Advanced Technology Attachment)).

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

The I/O adapter(s) 1116 can also communicate with a storage device, which can be a hard disk drive (HDD) or a solid-state drive ("SSD") 1118 which includes a SSD controller 1120, a host interface 1128 and a 3D NAND device 200.

The computer system 1100 can include a 3D NAND device 200 and a non-volatile memory controller 1138 communicatively coupled to the CPU module 1108 in the SoC 1104. The 3D NAND device 200 can be included in a dual in-line memory module (DIMM) that can be referred to as a non-volatile dual in-line memory module (NVDIMM).

A non-volatile memory (NVM) device is a memory whose state is determinate even if power is interrupted to the device. In one embodiment, the NVM device can comprise a block addressable memory device, such as NAND technologies, or more specifically, multi-threshold level NAND Flash memory (for example, Single-Level Cell ("SLC"), Multi-Level Cell ("MLC"), Quad-Level Cell ("QLC"), Tri-Level Cell ("TLC"), or some other NAND). A NVM device can also include a byte-addressable write-in-place three dimensional crosspoint memory device, or other byte addressable write-in-place memory (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

The I/O adapters L16 can include a Peripheral Component Interconnect Express (PCIe) adapter that is communicatively coupled using the NVMe (NVM Express) over PCIe (Peripheral Component Interconnect Express) protocol over bus 1144 to a host interface 1128 in the solid state drive 1118. Non-Volatile Memory Express (NVMe) standards define a register level interface for host software to communicate with a non-volatile memory subsystem (for example, a Solid-state Drive (SSD)) over Peripheral Component Interconnect Express (PCIe), a high-speed serial computer expansion bus). The NVM Express standards are available at www.nvmexpress.org. The PCIe standards are available at www.pcisig.com.

Applications 1130 and an operating system (OS) 1142 can be stored in volatile memory 1126. Volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

An operating system 1142 is software that manages computer hardware and software including memory allocation and access to I/O devices. Examples of operating systems include Microsoft® Windows®, Linux®, iOS® and Android®.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. A NAND device comprising:
   a memory array, the memory array including a plurality of blocks of NAND cells; and
   circuitry coupled to the memory array, wherein the circuitry is configured to perform a touchup program on a portion of programmed NAND cells in a block of NAND cells after a plurality of word lines in the block of NAND cells have been programmed, including concurrently:
   performing a series of verify and program operations on a target word line i until a set of NAND cells coupled to the target word line i reach a threshold voltage above a targeted touchup voltage; and
   while implementing a verify operation during the touchup program on the target word line i, reducing voltage levels of a group of word lines in a range between i−p and i+q from an inhibit voltage to ground sequentially in a staggered manner, where p is greater than or equal to 1 and q is greater than or equal to 1.

2. The NAND device of claim 1, wherein the touchup program on a selected programmed NAND cell in the block of NAND cells increases a threshold voltage of the selected programmed NAND cell while the inhibit voltage is applied to bit lines of non-selected programmed cells in the block of NAND cells.

3. The NAND device of claim 1, wherein the circuitry to perform the touchup program with a delay time after the NAND cells in the block of NAND cells have been programmed.

4. The NAND device of claim 3, wherein the delay time is selected based on a length of time after a NAND cell is programmed during which a charge loss is expected to occur after the NAND cell has been programmed.

5. The NAND device of claim 1, wherein the portion of programmed NAND cells in the block of NAND cells are in a target word line.

6. The NAND device of claim 5, wherein word lines in the block of NAND cells are inhibited during the touchup program on the target word line.

7. The NAND device of claim 5, wherein the target word line is a critical word line.

8. The NAND device of claim 1, wherein the touchup program is performed as a background operation while the memory array is idle.

9. A system comprising:
   a memory controller; and
   a NAND device coupled with the memory controller, the NAND device comprising: a memory array, the memory array including a plurality of blocks of NAND cells; and
   circuitry coupled to the memory array, wherein the circuitry is configured to perform a touchup program on a portion of programmed NAND cells in a block of NAND cells after a plurality of word lines in the block of NAND cells have been programmed, including concurrently:
   performing a series of verify and program operations on a target word line i until a set of NAND cells coupled to the target word line i reach a threshold voltage above a targeted touchup voltage; and
   while implementing a verify operation during the touchup program on the target word line i, reducing voltage levels of a group of word lines in a range between i−p and i+q from an inhibit voltage to ground sequentially in a staggered manner, where p is greater than or equal to 1 and q is greater than or equal to 1.

10. The system of claim 9, further comprising:
one or more of:
a processor,
a power supply, and
a display coupled with the NAND device.

11. The system of claim 9, wherein the touchup program on a selected programmed NAND cell in the block of NAND cells increases a threshold voltage of the selected programmed NAND cell while the inhibit voltage is applied to bit lines of non-selected programmed cells in the block of NAND cells.

12. The system of claim 9, wherein the circuitry to perform the touchup program with a delay time after the NAND cells in the block of NAND cells have been programmed.

13. The system of claim 12, wherein the delay time is selected based on a length of time after a NAND cell is programmed during which a charge loss is expected to occur after the NAND cell has been programmed.

14. The system of claim 9, wherein the portion of programmed NAND cells in the block of NAND cells are in a target word line.

15. The system of claim 14, wherein word lines in the block of NAND cells are inhibited during the touchup program on the target word line.

16. The system of claim 14, wherein the target word line is a critical word line.

17. The system of claim 9, wherein the touchup program is performed as a background operation while the memory array is idle.

18. A method, comprising:
performing a plurality of programming operations via a plurality of word lines of a NAND device, the NAND device including a memory array, the memory array including a plurality of blocks of NAND cells; and
performing a touchup program on a portion of programmed NAND cells in a block of NAND cells after the plurality of programming operations, including concurrently:
performing a series of verify and program operations on a target word line i until a set of NAND cells coupled to the target word line i reach a threshold voltage above a targeted touchup voltage; and
while implementing a verify operation during the touchup program on the target word line i, reducing voltage levels of a group of word lines in a range between i−p and i+q from an inhibit voltage to ground sequentially in a staggered manner, where p is greater than or equal to 1 and q is greater than or equal to 1.

19. The method of claim 18, wherein the touchup program is performed with a delay time after the plurality of programming operations.

20. The method of claim 18, wherein the touchup program is performed as a background operation while the memory array is idle.

* * * * *